United States Patent
Sugii et al.

(10) Patent No.: US 12,061,725 B2
(45) Date of Patent: Aug. 13, 2024

(54) INFORMATION PROCESSING SYSTEM, INFORMATION PROCESSING APPARATUS, AND NON-TRANSITORY COMPUTER READABLE MEDIUM STORING PROGRAM FOR SAVING RESOURCE OF INFORMATION PROCESSING APPARATUS

(71) Applicant: FUJIFILM Business Innovation Corp., Tokyo (JP)

(72) Inventors: Masato Sugii, Kanagawa (JP); Hiroshige Nonaka, Kanagawa (JP); Satoshi Watanabe, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 265 days.

(21) Appl. No.: 17/578,358

(22) Filed: Jan. 18, 2022

(65) Prior Publication Data

US 2023/0083103 A1 Mar. 16, 2023

(30) Foreign Application Priority Data

Sep. 16, 2021 (JP) ................. 2021-150840

(51) Int. Cl.
*G06F 21/62* (2013.01)
*G06F 9/48* (2006.01)
*G06F 21/44* (2013.01)
*G06F 21/60* (2013.01)

(52) U.S. Cl.
CPC ........ *G06F 21/6281* (2013.01); *G06F 9/4881* (2013.01); *G06F 21/44* (2013.01); *G06F 21/606* (2013.01)

(58) Field of Classification Search
None
See application file for complete search history.

(56) References Cited

U.S. PATENT DOCUMENTS

| | | |
|---|---|---|
| 10,015,356 B2 | 7/2018 | Hori |
| 10,747,487 B2 * | 8/2020 | Bermundo ............ G06F 3/1298 |
| 11,632,482 B1 * | 4/2023 | Watanabe .......... H04N 1/00244 358/1.15 |

(Continued)

FOREIGN PATENT DOCUMENTS

| | | |
|---|---|---|
| EP | 3123411 | 9/2020 |
| JP | 6264800 | 1/2018 |

(Continued)

OTHER PUBLICATIONS

"Invitation Pursuant to Rule 63(1) EPC of Europe Counterpart Application", issued on Jul. 12, 2022, p. 1-p. 6.

(Continued)

*Primary Examiner* — Boris D Grijalva Lobos
(74) *Attorney, Agent, or Firm* — JCIPRNET (57) ABSTRACT

An information processing system includes an information processing apparatus; and a server, in which the server acquires data to be processed from the information processing apparatus and executes processing on the data, and the information processing apparatus transmits the data to be processed to the server as a first job, and acquires data of a processing result for the data to be processed, which is transmitted to the server in the first job, as a second job different from the first job.

15 Claims, 8 Drawing Sheets

(56) References Cited

U.S. PATENT DOCUMENTS

| | | | | |
|---|---|---|---|---|
| 2005/0080330 A1* | 4/2005 | Masuzawa | ............ | G16H 30/20 |
| | | | | 600/407 |
| 2005/0198634 A1* | 9/2005 | Nielsen | ................ | G06F 9/5044 |
| | | | | 718/100 |
| 2010/0042723 A1* | 2/2010 | Sundarrajan | ........ | H04L 43/0876 |
| | | | | 709/226 |
| 2010/0182640 A1* | 7/2010 | Daigo | ................ | H04N 1/00214 |
| | | | | 358/1.15 |
| 2011/0026064 A1* | 2/2011 | Kato | ...................... | H04N 1/442 |
| | | | | 358/1.14 |
| 2012/0215828 A1* | 8/2012 | Torii | ..................... | G06F 3/1285 |
| | | | | 709/202 |
| 2013/0107309 A1* | 5/2013 | Kondoh | ................ | G06F 3/1203 |
| | | | | 358/1.14 |
| 2015/0092219 A1* | 4/2015 | Kanemoto | ......... | H04N 1/00244 |
| | | | | 358/1.14 |
| 2016/0378406 A1* | 12/2016 | Kaku | .................... | G06F 3/1205 |
| | | | | 358/1.15 |
| 2018/0239749 A1* | 8/2018 | Zusman | ................. | G06F 9/4843 |
| 2019/0042328 A1* | 2/2019 | Ortega | .................. | G06F 9/5055 |
| 2023/0083103 A1* | 3/2023 | Sugii | ........................ | G06F 9/542 |
| | | | | 726/26 |
| 2023/0106262 A1* | 4/2023 | Nonaka | .............. | H04N 1/32096 |
| | | | | 358/1.14 |

FOREIGN PATENT DOCUMENTS

| | | | | |
|---|---|---|---|---|
| JP | 2018098741 A | * | 6/2018 | |
| JP | 2021071879 A | * | 5/2021 | ........... G06F 3/1207 |

OTHER PUBLICATIONS

"Search Report of Europe Counterpart Application", issued on Nov. 15, 2022, p. 1-p. 10.

* cited by examiner

INFORMATION PROCESSING SYSTEM, INFORMATION PROCESSING APPARATUS, AND NON-TRANSITORY COMPUTER READABLE MEDIUM STORING PROGRAM FOR SAVING RESOURCE OF INFORMATION PROCESSING APPARATUS

CROSS-REFERENCE TO RELATED APPLICATIONS

This application is based on and claims priority under 35 USC 119 from Japanese Patent Application No. 2021-150840 filed Sep. 16, 2021.

BACKGROUND

(i) Technical Field

The present invention relates to an information processing system, an information processing apparatus and a non-transitory computer readable medium storing a program.

(ii) Related Art

In data processing by an information processing apparatus, a part of the processing in one job may be executed by an external apparatus. In this case, for example, the processing is executed while exchanging data and a processing result between the apparatuses according to individual processing included in the job and a workflow in which an execution subject of each processing is defined.

JP6264800B discloses an information processing system in which workflow information that defines the order of a plurality of processing and the information processing apparatus that is an execution subject of each of the plurality of processing defines one information processing apparatus selected from a plurality of information processing apparatuses as the execution subject, each of the plurality of processing defined in the execution subject and defined in the workflow information is executed by the information processing apparatus defined as the execution subject in the defined order, and processing, in which the execution subject in the workflow information is one information processing apparatus selected among the plurality of information processing apparatuses, is executed by the one information processing apparatus selected according to a predetermined determination condition.

SUMMARY

In a case where a part of processing in one job executed by an information processing apparatus is executed by an external apparatus, the job related to the processing is retained in the information processing apparatus until the processing by the external apparatus ends, so that a resource, such as a memory is wasted.

Aspects of non-limiting embodiments of the present disclosure relate to an information processing system, an information processing apparatus and a non-transitory computer readable medium storing a program that suppress consumption of resources of the information processing apparatus after transmitting data to the external apparatus, as compared with a configuration in which a part of the processing in one job executed in the information processing apparatus is executed by the external apparatus.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing system including an information processing apparatus and a server, in which the server acquires data to be processed from the information processing apparatus and executes processing on the data, and the information processing apparatus transmits the data to be processed to the server as a first job, and acquires data of a processing result for the data to be processed, which is transmitted to the server in the first job, as a second job different from the first job.

BRIEF DESCRIPTION OF THE DRAWINGS

Exemplary embodiment(s) of the present invention will be described in detail based on the following figures, wherein.

DETAILED DESCRIPTION

Figure 1:
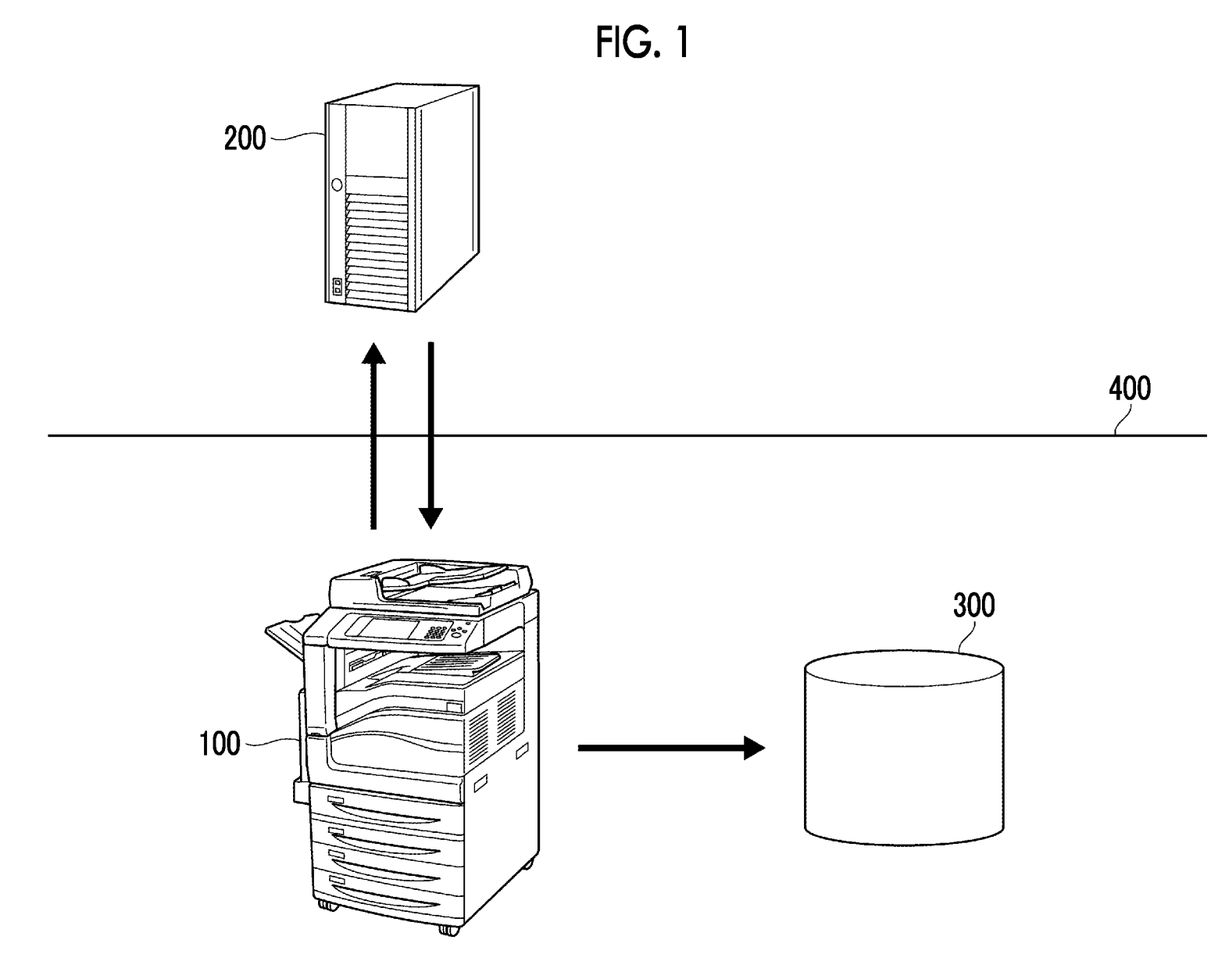
FIG. 1 is a diagram showing an overall configuration of an information processing system according to the present exemplary embodiment.

Hereinafter, an exemplary embodiment of the present invention will be described in detail with reference to the accompanying drawings.
System Configuration FIG. 1 is a diagram showing an overall configuration of an information processing system according to the present exemplary embodiment. The information processing system of the present exemplary embodiment includes an information processing apparatus 100, a processing execution server 200, and a management server 300. The information processing apparatus 100 is an apparatus that executes data processing. The information processing apparatus 100 may include, in addition to a personal computer, various apparatuses that can be connected to the processing execution server 200 and the management server 300, which are external apparatuses, via a function of processing data and a network.

The processing execution server 200 is a server that acquires data from the information processing apparatus 100 to execute processing. The processing execution server 200 is a server provided over the network, may be configured as a single server machine, or may be realized by a virtual server or a cloud server that realizes a function as the processing execution server 200 by a plurality of servers. The processing execution server 200 is an example of an external server. The management server 300 is a storage server that stores and manages data. The management server 300 stores data of processing results by the information processing apparatus 100 and the processing execution server 200. The management server 300 is an example of the external apparatus.

The information processing apparatus 100, the processing execution server 200, and the management server 300 are connected via the network. In the configuration shown in FIG. 1, a firewall 400 is set between the information processing apparatus 100, the management server 300, and the processing execution server 200, and the information processing apparatus 100 and the management server 300 are protected by the firewall 400. Therefore, the information processing apparatus 100 can access the processing execution server 200 but the processing execution server 200 cannot access the information processing apparatus 100 and cannot access the management server 300 over the firewall 400.

As described above, the information processing apparatus 100 may be realized using various apparatuses that perform data processing. As an example, a case is considered where the information processing apparatus 100 is realized by an image processing apparatus. Hereinafter, the image processing apparatus as the information processing apparatus 100 will be described as an "image processing apparatus 100" with a reference numeral of the information processing apparatus 100. In the system shown in FIG. 1, the image processing apparatus 100 requests the processing execution server 200 to perform a part of processing for data such as an image to be processed. The processing execution server 200 performs processing for the image acquired from the image processing apparatus 100. Then, in a case where the processing execution server 200 accepts the request from the image processing apparatus 100, the processing execution server 200 returns a processing result for the image to the image processing apparatus 100. The image processing apparatus 100 sends data of the processing result acquired from the processing execution server 200 to the management server 300.

A specific example of an aspect, in which the image processing apparatus 100 and the processing execution server 200 are used, is considered. For example, the image processing apparatus 100 reads an image of a form such as an invoice or a receipt, and requests the processing execution server 200 to analyze the image of the form. Further, the image processing apparatus 100 may acquire electronic data of the form and request the processing execution server 200 to analyze the form based on the electronic data. Hereinafter, the image data and the electronic data of the form are collectively referred to as "form data". The processing execution server 200 analyzes the form data acquired from the image processing apparatus 100, and performs data processing according to content of the form recognized based on an analysis result. Further, the processing execution server 200 specifies a storage destination of the analysis result and a data processing result based on the content of the form. Then, the processing execution server 200 returns the analysis result of the form data and the data processing result according to the content of the form in response to the request from the image processing apparatus 100. The image processing apparatus 100 sends and stores the analysis result and the data processing result acquired from the processing execution server 200 to the management server 300.

Configuration of Information Processing Apparatus 100

Figure 2:
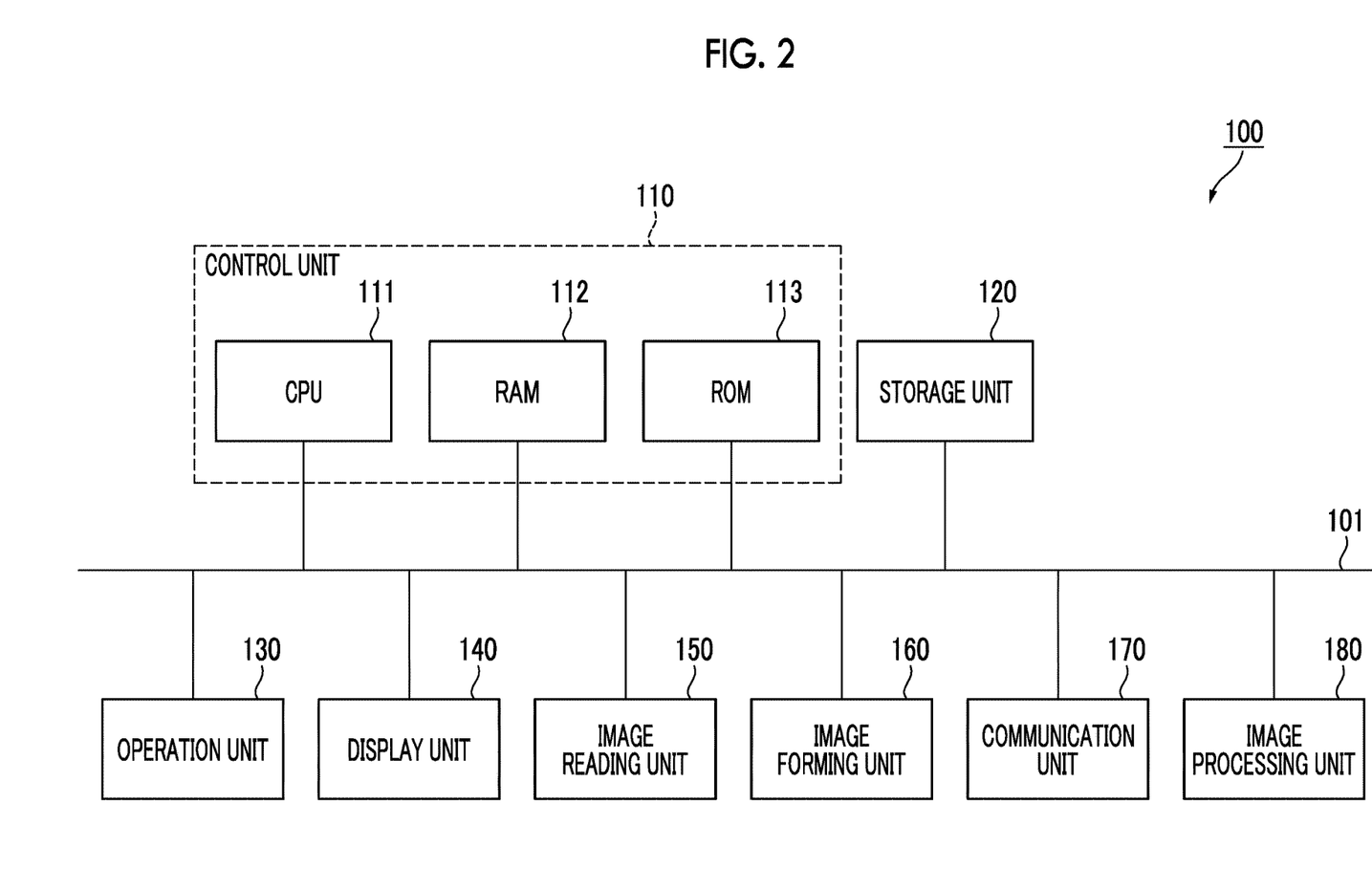
FIG. 2 is a diagram illustrating a configuration of an image processing apparatus.

FIG. 2 is a diagram illustrating a configuration of the image processing apparatus 100. Here, the configuration of the image processing apparatus 100 as an example of the information processing apparatus 100 will be described. The image processing apparatus 100 includes a control unit 110, a storage unit 120, an operation unit 130, a display unit 140, an image reading unit 150, an image forming unit 160, a communication unit 170, and an image processing unit 180. Each of the functional units is connected to a bus 101, and exchanges data via the bus 101.

The control unit 110 controls each of the above-described functional units in the image processing apparatus 100. Further, the control unit 110 is a functional unit that executes various data processing. The control unit 110 includes a Central Processing Unit (CPU) 111 that is an arithmetic calculation section, and a Random Access Memory (RAM) 112 and a Read Only Memory (ROM) 113 that are storage sections. The RAM 112 is a main storage device (main memory) and is used as a working memory in a case where the CPU 111 performs arithmetic calculation processing. The ROM 113 holds a program and data such as a set value that is prepared in advance, and the CPU 111 directly reads the program and the data from the ROM 113 and executes processing. The program and the data are also stored in the storage unit 120. The CPU 111 reads and executes the program stored in the storage unit 120 in the RAM 112. Functions for performing various data processing and control in the image processing apparatus 100, which will be described later, are realized by executing the program by, for example, the CPU 111.

The storage unit 120 is a functional unit that stores programs and data to be executed by the CPU 111 as described above, and also stores various data, such as image data read by the image reading unit 150, generated by various operations. The storage unit 120 is realized by, for example, a storage device such as a magnetic disk device or a Solid State Drive (SSD).

The operation unit 130 is a functional unit that accepts an operation of a user. The operation unit 130 is configured with, for example, a hardware key, a touch sensor that outputs a control signal according to a position pressed or touched by a finger, or the like. The operation unit 130 may be configured as a touch panel in which a touch sensor is combined with a liquid crystal display configuring the display unit 140.

The display unit 140 is a functional unit that displays an information image that presents various information to the user, a preview image of an image to be processed, for example, to be read or to be output, an operation image to be operated by the user, and the like. The display unit 140 is configured with, for example, the liquid crystal display. The operation unit 130 and the display unit 140 may be combined to be used as a user interface section for the user to input and output information to and from the image processing apparatus 100.

The image reading unit 150 is a functional unit that optically reads an image on a document. A method for reading the image is used with, for example, a CCD method in which reflected light for light irradiating the document from a light source is reduced by a lens and received by Charge Coupled Devices (CCD), or a CIS method in which the reflected light for light irradiating the document in order from a Light Emitting Diode (LED) light source is received by the Contact Image Sensor (CIS).

The image forming unit 160 is a functional unit that forms an image based on the image data on a recording material, such as paper, by using an image forming material. As a method for forming the image on the recording material, for example, an electrophotographic method is used in which toner is used as the image forming material and the image is formed by transferring the toner attached to a photoconductor to the recording material.

The communication unit 170 is a functional unit that transmits and receives a command and data to and from the external apparatus. As the communication unit 170, an interface corresponding to a communication method with the external apparatus is used. The connection with the external apparatus may be performed via the network or may be performed by direct connection. A communication line may be a wired line or a wireless line.

The image processing unit 180 is a functional unit that includes a processor as an arithmetic calculation section and a working memory, and performs image processing, such as color correction or gradation correction, on the image represented by the image data. The CPU 111 of the control unit 110 may be used as the processor, and the RAM 112 of the control unit 110 may be used as the working memory, respectively.

Transfer of Data and Procedure of Processing

Next, a transfer of data and a procedure of processing between the image processing apparatus 100 and the processing execution server 200 will be described. In the description below, the above-described form data will be described as an example of data to be processed.

The image processing apparatus 100 accesses the processing execution server 200, causes the processing execution server 200 to execute a part of processing such as analysis of the form data to be processed, and acquires the processing result. Here, the image processing apparatus 100 executes an operation of sending the form data to be processed to the processing execution server 200 and an operation of acquiring the processing result from the processing execution server 200 as different jobs. Hereinafter, the operation of sending the data to be processed to the processing execution server 200 is referred to as a first job, and the operation of acquiring the processing result from the processing execution server 200 is referred to as a second job.

By dividing the operations as different jobs, the image processing apparatus 100 can release the resource, such as a memory area, used for execution of the job and can use the resource to execute another processing until the second job is started after the first job ends. On the other hand, since the operations are divided as the different jobs, a mechanism is necessary for the image processing apparatus 100 and the processing execution server 200 to recognize that the jobs are related jobs related to an identical processing target. Here, as an example, a job ID as identification information used to identify the related job is set.

Further, the processing execution server 200 cannot access the image processing apparatus 100 over the firewall 400. Therefore, in order for the processing execution server 200 to send the processing result to the image processing apparatus 100, the image processing apparatus 100 needs to make a processing result transmission request to the processing execution server 200. Therefore, a mechanism is necessary for the image processing apparatus 100 to recognize that the processing of the processing execution server 200 is completed. Here, an operation for inquiring whether or not the processing is completed is performed from the image processing apparatus 100 to the processing execution server 200.

Figure 3:
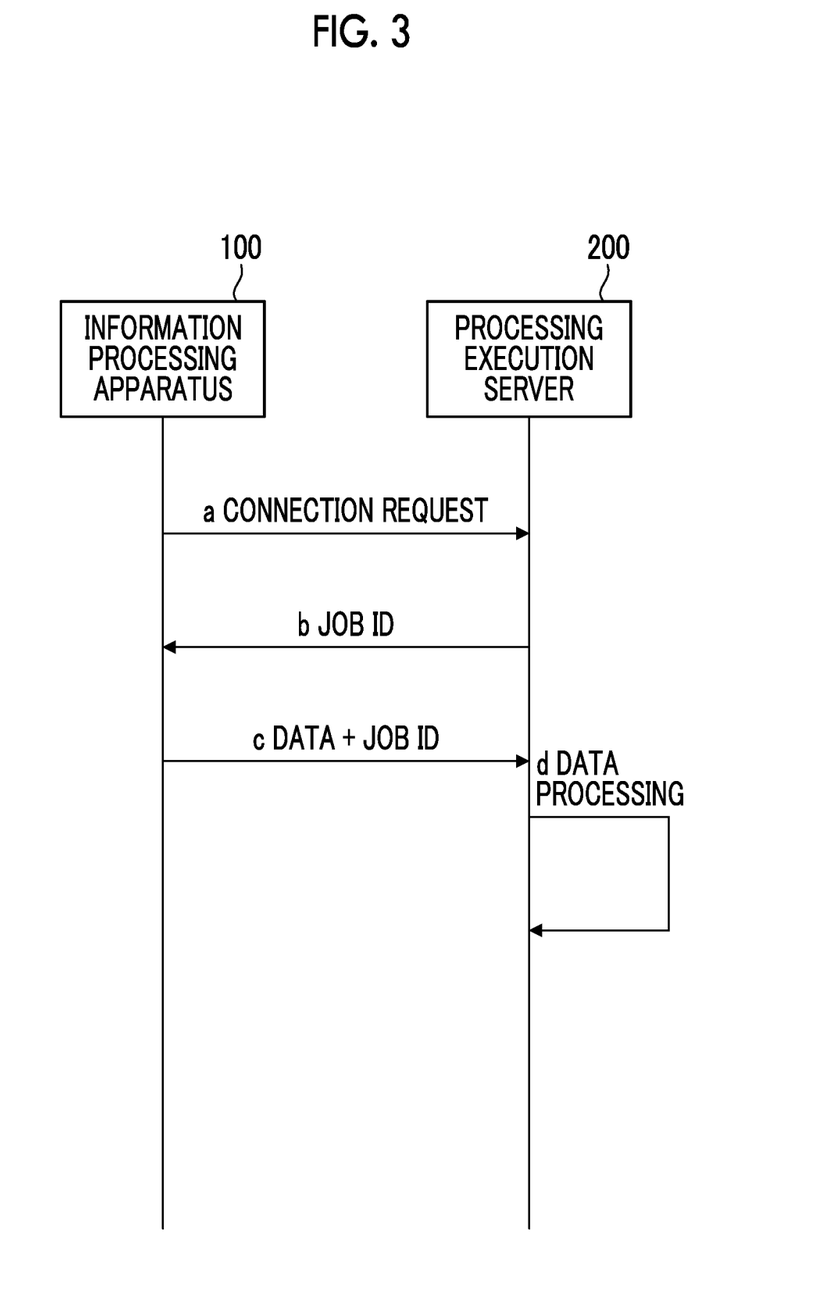
FIG. 3 is a sequence diagram showing data exchange between the image processing apparatus and a processing execution server in a first job.

FIG. 3 is a sequence diagram showing data exchange between the image processing apparatus 100 and the processing execution server 200 in the first job. First, the image processing apparatus 100 (described as "information processing apparatus" in the drawing) makes a connection request to the processing execution server 200 (a). The processing execution server 200 generates a job ID in response to the connection request, and transmits the job ID to the image processing apparatus 100 (b). In a case where the image processing apparatus 100 acquires the job ID from the processing execution server 200, the image processing apparatus 100 adds the acquired job ID to the form data to be processed and transmits the form data to the processing execution server 200 (c).

In a case where the processing execution server 200 receives the data to be processed and the job ID, the processing execution server 200 executes processing for the received form data (d). Here, the processing execution server 200 analyzes the received form data and recognizes the content of the form. Then, the processing execution server 200 executes data processing according to the content of the recognized form. Further, depending on content of the data processing, the processing execution server 200 adds information obtained by executing the data processing, as additional information, to the processing result. For example, in a case where the image processing apparatus 100 stores the processing result by the processing execution server 200 in the management server 300 and in a case where the storage destination information is obtained from the analysis result or the data processing result by the processing execution server 200, the storage destination information is added to the processing result.

Figure 4:
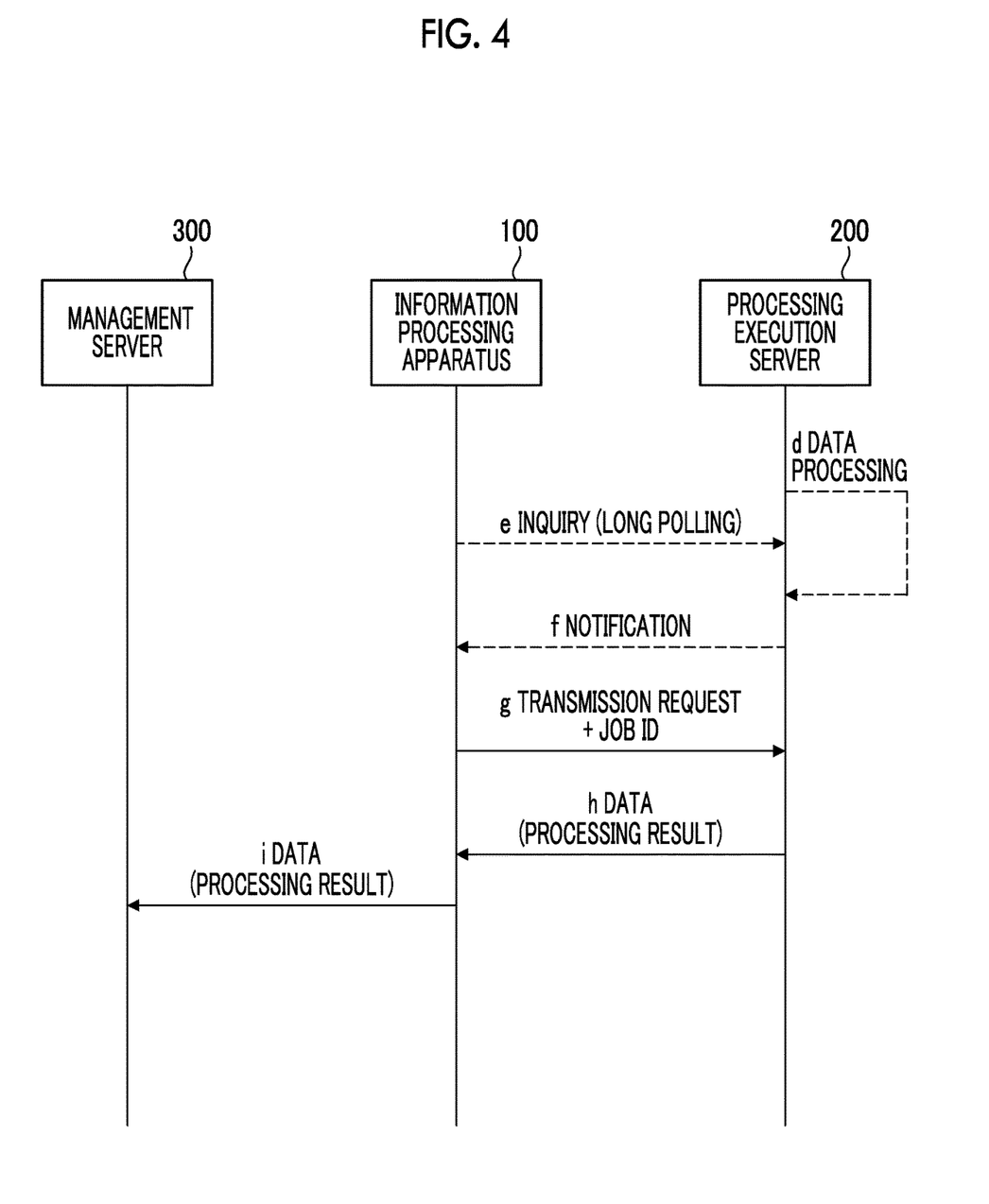
FIG. 4 is a sequence diagram showing data exchange between the image processing apparatus and the processing execution server in a second job.

FIG. 4 is a sequence diagram showing data exchange between the image processing apparatus 100 and the processing execution server 200 in the second job. After the image processing apparatus 100 (described as "information processing apparatus" in the drawing) transmits the form data to the processing execution server 200, the image processing apparatus 100 makes an inquiry to receive a notification that the processing is completed from the processing execution server 200 (e). The inquiry is made, for example, by long polling. In a case where the processing execution server 200 accepts the inquiry from the image processing apparatus 100, the processing execution server 200 responds to the inquiry and notifies the image processing apparatus 100 that the data processing is completed, after data processing (d) is completed (f).

In a case where the image processing apparatus 100 receives the notification indicating that the data processing is completed from the processing execution server 200, the image processing apparatus 100 transmits the processing result transmission request to the processing execution server 200, together with the job ID acquired in the first job (g). The processing execution server 200 returns the processing result corresponding to the job ID to the image processing apparatus 100 in response to the transmission request received from the image processing apparatus 100 (h). The image processing apparatus 100 sends the processing result acquired from the processing execution server 200 to the management server 300 (i). At this time, in a case where the additional information is added to the processing result, the image processing apparatus 100 may execute processing for the processing result acquired from the processing execution server 200 based on the acquired additional information. For example, in a case where the storage destination information of the processing result is added to the processing result as the additional information, the image processing apparatus 100 transmits the processing result to the storage destination based on the additional information.

As described above, in the present exemplary embodiment, in a case where the image processing apparatus 100 accesses the processing execution server 200, the processing execution server 200 issues the job ID and the job ID is shared between the image processing apparatus 100 and the processing execution server 200. Then, the image processing apparatus 100 adds the job ID to the data to be transmitted to the processing execution server 200 in the first job and the transmission request to acquire the processing result in the second job. As a result, the processing execution server 200 recognizes that the data to be processed, which is received in advance, and the processing result transmission request received later are due to the related jobs.

Further, the image processing apparatus 100 makes an inquiry about the completion of the processing to the processing execution server 200 after transmitting the data to be processed to the processing execution server 200. In a case where the processing execution server 200 responds to the inquiry, the processing execution server 200 can provide the notification that the processing is completed to the image processing apparatus 100 over the firewall 400, and the image processing apparatus 100 can recognize that the processing is completed in the processing execution server 200. As long as the inquiry can pass through the firewall 400 in such a way that the processing execution server 200 responds, a method is not particularly limited. As an example, in a case where long polling is used as described above, complexity of repeating the inquiry many times until the image processing apparatus 100 receives the response from the processing execution server 200 as in normal polling can be suppressed.

Operation of Information Processing Apparatus

Figure 5:
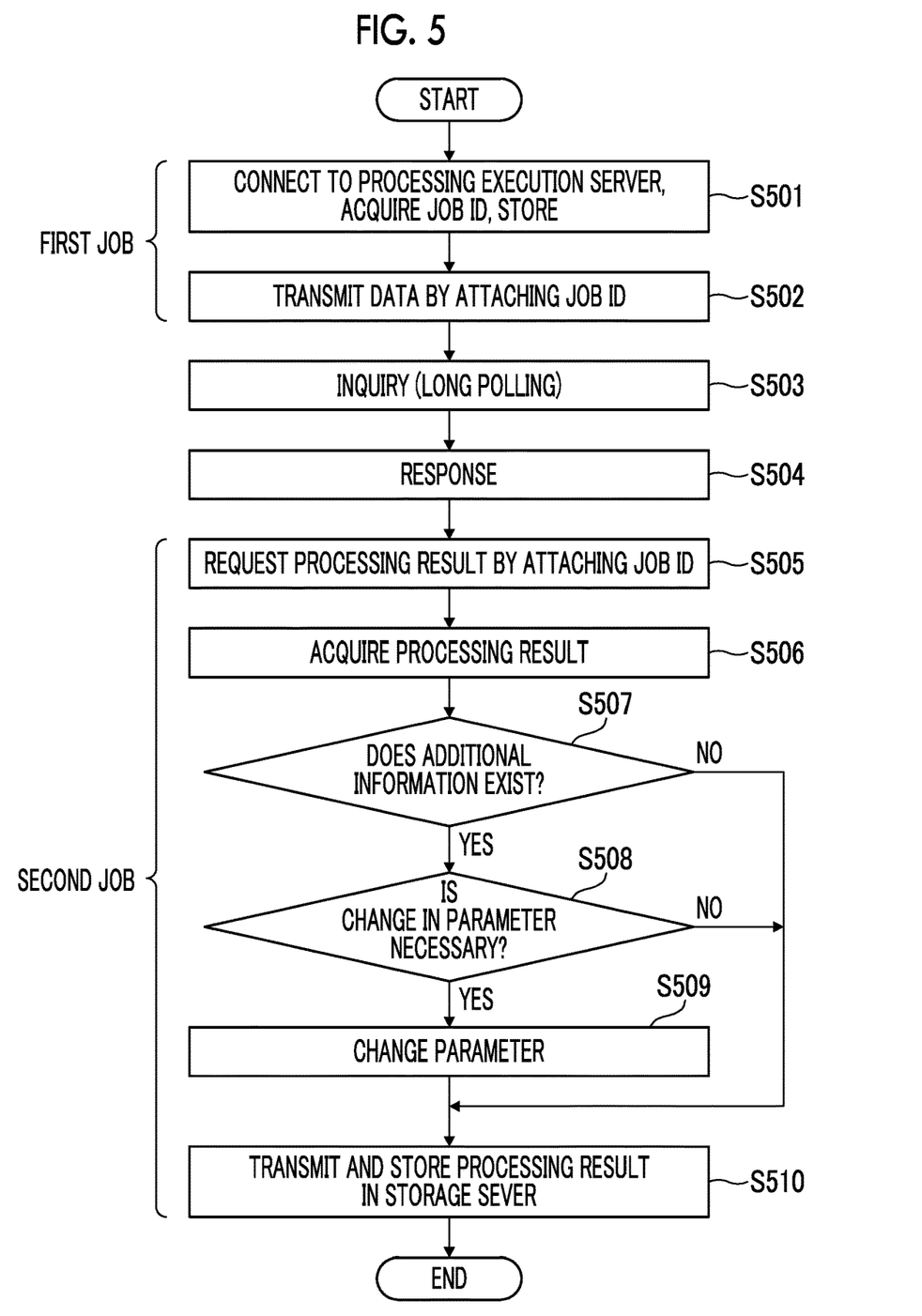
FIG. 5 is a flowchart showing an operation of an information processing apparatus.

FIG. 5 is a flowchart showing an operation of the information processing apparatus 100. In an operation example, the above-described form data will be described as an example of data to be processed. The image processing apparatus 100 as the information processing apparatus 100 first connects to the processing execution server 200, acquires and stores the job ID from the processing execution server 200 (S501). The acquired job ID is stored in, for example, the storage unit 120 shown in FIG. 2. Next, the image processing apparatus 100 attaches the acquired job ID to the form data to be processed and transmits the form data to the processing execution server 200 (S502). As a result, data processing is started in the processing execution server 200. The above operation corresponds to an operation of the first job by the information processing apparatus 100.

Next, the image processing apparatus 100 makes the inquiry about the completion of the processing to the processing execution server 200 (S503). The inquiry is made by, for example, long polling. In a case where the response to the inquiry is accepted from the processing execution server 200 (S504), the image processing apparatus 100 attaches the job ID acquired in S501 to the processing result transmission request and transmits the resulting processing result transmission request to the processing execution server 200 (S505). Then, the image processing apparatus 100 acquires the processing result from the processing execution server 200 (S506). The operation subsequent to the processing result transmission request shown in S505 corresponds to the operation of the second job by the information processing apparatus 100.

Next, the image processing apparatus 100 determines whether or not additional information is added to the acquired processing result. Here, information indicating the storage destination of the processing result may be added as the additional information. For example, in a case where a path of the management server 300 is specified as the storage destination according to a type of the form to be processed or in a case where the storage destination is recorded in a document of the form, the processing execution server 200 specifies the storage destination of the processing result in the processing result of the form data. In such a case, the storage destination information specified by the data processing is added to the processing result as the additional information.

In a case where the additional information is added to the processing result (YES in S507), the image processing apparatus 100 determines whether or not a parameter needs to be changed in processing to be executed for the processing result of the processing execution server 200 based on the additional information. For example, in the above example in which the storage destination information is added, in a case where only the management server 300 is determined to be related to the storage destination and the path of the management server 300 is specified by the additional information, addition of the path is necessary as the parameter in the storage destination information. Further, in a case where the path of the management server 300 is determined to be related to the storage destination in advance but the path specified by the additional information is different from a predetermined path, a change in the path is necessary as the parameter in the storage destination information. On the other hand, in a case where the path of the management server 300 is determined to be related to the storage destination in advance and the path specified by the additional information is identical with the predetermined path, the change in the path is not necessary as the parameter in the storage destination information.

In a case where the change in the parameter is necessary (YES in S508), the image processing apparatus 100 changes the corresponding parameter based on the additional information (S509). Then, the image processing apparatus 100 transmits and stores the processing result to the management server 300, which is a storage server, according to the changed parameter (S510). Further, in a case where the additional information is not added to the processing result acquired from the processing execution server 200 (NO in S507) and in a case where the parameter does not need to be changed based on the additional information (NO in S508), the image processing apparatus 100 transmits and stores the processing result in the management server 300 according to original setting (S510).

Operation of Processing Execution Server

Figure 6:
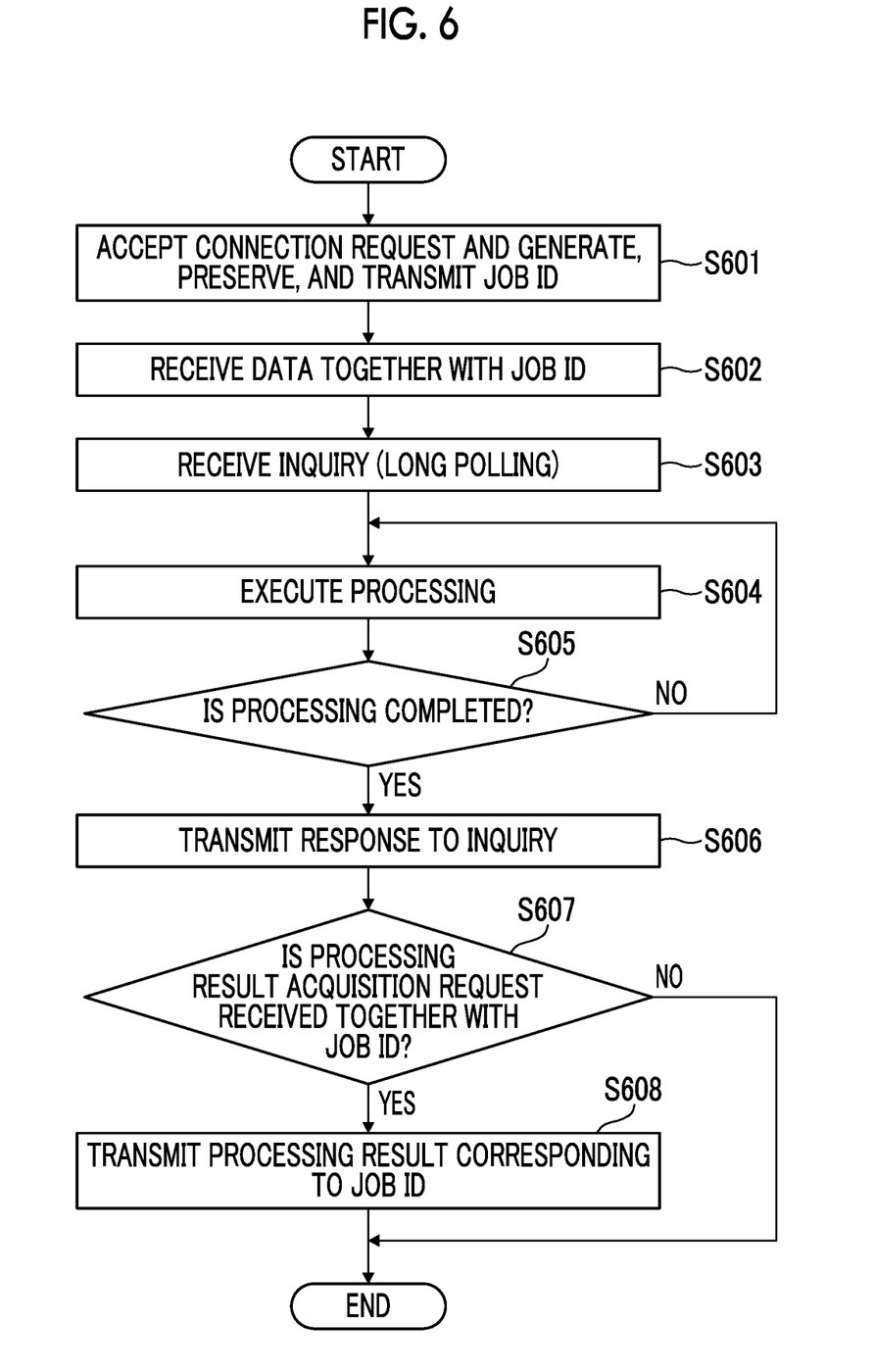
FIG. 6 is a flowchart showing an operation of processing execution.

FIG. 6 is a flowchart showing an operation of the processing execution server 200. In a case where the processing execution server 200 accepts the connection request from the image processing apparatus 100, the processing execution server 200 generates and stores the job ID, and transmits the generated job ID to the image processing apparatus 100 (S601). Thereafter, the processing execution server 200 receives the form data to be processed, to which the job ID is added from the image processing apparatus 100 (S602). Further, the processing execution server 200 accepts an inquiry about the completion of processing from the image processing apparatus 100 (S603).

The processing execution server 200 executes processing on the received form data (S604), and, in a case where the processing is completed, transmits a response to the inquiry accepted in S603 to the image processing apparatus 100 (S605 and S606). Thereafter, in a case where the processing execution server 200 receives a processing result acquisition request, to which the job ID generated in S601 is added, from the image processing apparatus 100 (YES in S607), the processing execution server 200 transmits the processing result corresponding to the received job ID to the image processing apparatus 100 (S608).

On the other hand, in a case where the processing result does not need to be transmitted to the image processing apparatus 100, the processing execution server 200 ends the processing because the processing result acquisition request is not transmitted from the image processing apparatus 100 (NO in S607). The case where the processing result does not need to be transmitted to the image processing apparatus 100 is a case where the image processing apparatus 100 does not perform processing on the processing result of the processing execution server 200. For example, the above case includes a case where the processing result is held in the processing execution server 200 without returning to the image processing apparatus 100, or a case where the processing result is stored in a server provided outside the firewall 400 (the same side as the processing execution server 200). Whether or not the processing result needs to be transmitted to the image processing apparatus 100 is predetermined, and includes a case of being specified in a case where the form data to be processed is received and a case of being specified as a result of the data processing.

First Modification Example

In the present exemplary embodiment, the operation of sending the form data to be processed by the information processing apparatus 100 to the processing execution server 200 and the operation of acquiring the processing result from the processing execution server 200 are set as different jobs. Utilizing this, as a modification example of the present exemplary embodiment, a configuration may be provided in which the first job and the second job are executed by different information processing apparatuses 100. In other words, an execution authority of the second job related to the first job performed by one information processing apparatus 100 may be settable to the other information processing apparatus 100. In this case, the other information processing apparatus 100 executes the second job to which the execution authority is set, and acquires the data of the processing result for the data to be processed, which is transmitted to the server in the first job related to the second job.

In a case where the processing execution server 200 executes data processing on a request from the information processing apparatus 100, an event may occur in which the information processing apparatus 100 cannot acquire the processing result of the processing execution server 200. For example, a case where, after the first job ends, the information processing apparatus 100 cannot perform connection to the processing execution server 200 because a failure occurs, a case where the information processing apparatus 100 is turned off, and a case where another processing having a large load is started in the information processing apparatus 100 may be conceivable. In such a case, the second job may be taken over and executed by an information processing apparatus 100 different from the information processing apparatus 100 that performs the first job. The takeover of the execution authority of the second job is performed by passing the job ID to the other information processing apparatus 100 by the information processing apparatus 100 that has performed the first job.

From the viewpoint of the information processing apparatus 100 that takes over the execution authority of the second job, the information processing apparatus 100 takes over the execution authority of the second job related to the first job executed by the other information processing apparatus 100 to execute the second job based on the execution authority. The information processing apparatus 100 acquires the job ID set for the first job executed by the other information processing apparatus 100, and adds the job ID in the second job to make a processing result data acquisition request to the processing execution server 200. Then, a processing result of data specified based on the job ID is acquired.

Figure 7:
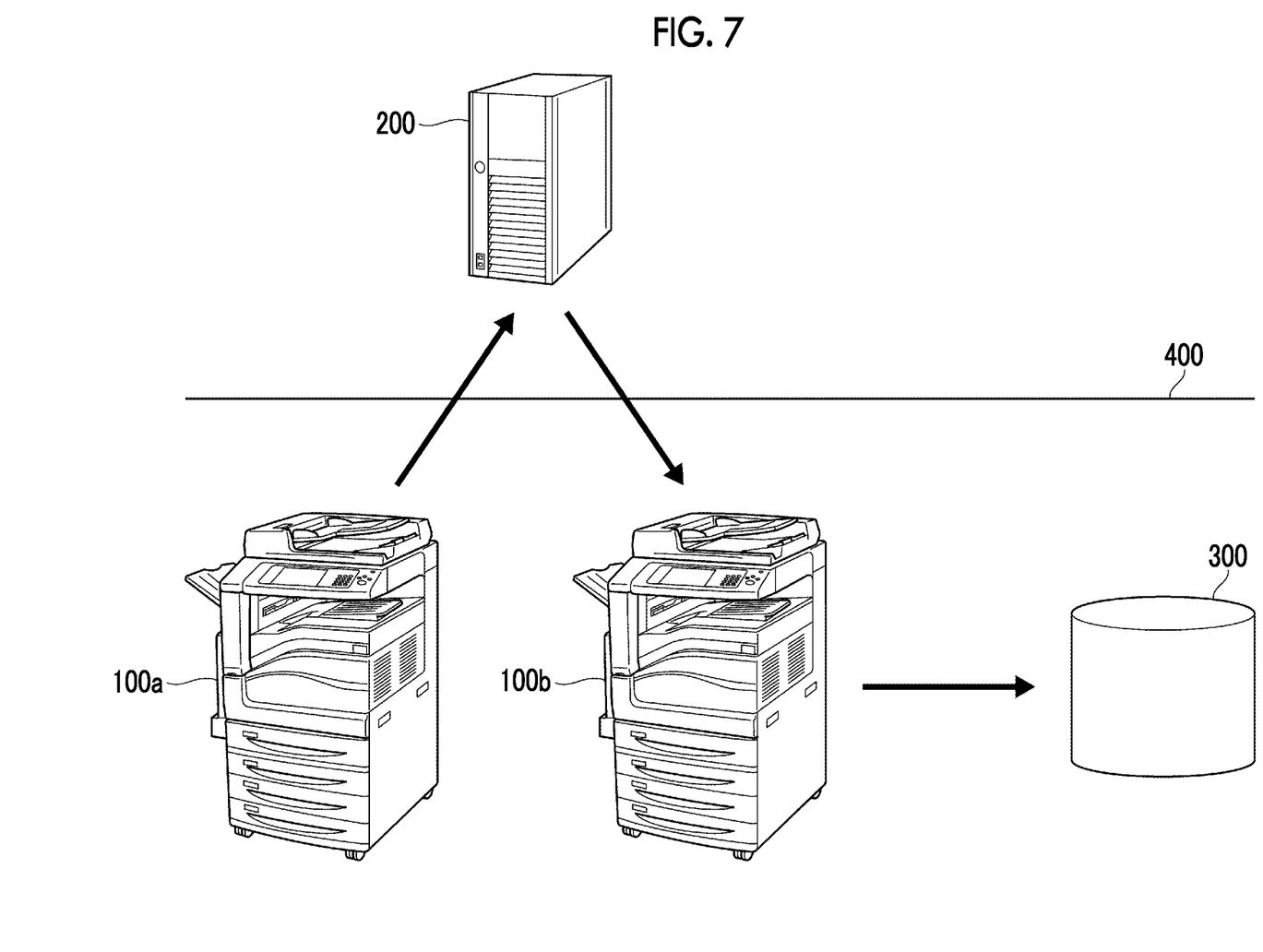
FIG. 7 is a diagram showing a first modification example of the information processing system according to the present exemplary embodiment.

FIG. 7 is a diagram showing a first modification example of the information processing system according to the present exemplary embodiment. In the example shown in FIG. 7, the information processing apparatus 100 that executes the first job is described as an information processing apparatus 100a with a subscript "a", and the information processing apparatus 100 that executes the second job is described as an information processing apparatus 100b with a subscript "b".

In the configuration shown in FIG. 7, the information processing apparatus 100a requests the processing execution server 200 for a part of the processing for the data to be processed as the first job. The processing execution server 200 performs processing for the data acquired from the information processing apparatus 100a. On the other hand, the information processing apparatus 100b makes the processing result transmission request to the processing execution server 200 as the second job. In a case where the processing execution server 200 accepts the request from the information processing apparatus 100b, the processing execution server 200 returns the processing result to the information processing apparatus 100b. The information processing apparatus 100b sends the data of the processing result acquired from the processing execution server 200 to the management server 300.

Here, in the present exemplary embodiment, the job ID is used as a mechanism for the image processing apparatus 100 and the processing execution server 200 to recognize that the first job and the second job are related jobs related to the identical processing target. Specifically, the processing execution server 200 issues the job ID in response to an access from the information processing apparatus 100a to the processing execution server 200. Then, by adding the job ID for the transmission of the data to be processed, which is the first job, and the processing result transmission request, which is the second job, the processing execution server 200 recognizes that the operations are based on the related jobs. In a case where the processing execution server 200 accepts the processing result acquisition request made by adding the job ID from another information processing apparatus 100b different from the information processing apparatus 100a that performs the first job, the processing result of the data specified by the job ID is transmitted to the information processing apparatus 100b.

In the modification example, since the job ID is used in the second job, the job ID is passed from the information processing apparatus 100a to the information processing apparatus 100b. Here, in a case where the information processing apparatus 100a knows in advance that execution of the second job is difficult as in a case where processing with a large load is performed, the information processing apparatus 100b can be specified in advance and the job ID can be transferred and be held. On the other hand, in a case where the information processing apparatus 100a suddenly becomes unable to execute the second job due to the occurrence of a failure or the like, the information processing apparatus 100b cannot hold the job ID beforehand. Therefore, after confirming that the second job cannot be executed in the information processing apparatus 100a, a mechanism for enabling the job ID to be used in the information processing apparatus 100b is necessary.

As an example, the job ID is stored in a storage device that can be shared by the information processing apparatus 100a and the information processing apparatus 100b, and the job ID may be used in a case where the information processing apparatus 100b needs to execute the second job. In a case where the number of information processing apparatuses 100b capable of executing the second job is small, the job ID may be duplicated in advance and may be passed to and held in each of the information processing apparatuses 100b.

Second Modification Example

In the present exemplary embodiment, the processing result of the processing execution server 200 is stored in the management server 300 provided inside the firewall 400 (the same side as the information processing apparatus 100). Therefore, the processing execution server 200 returns the processing result in response to the request from the information processing apparatus 100, and the information processing apparatus 100 sends the acquired processing result to the management server 300. On the other hand, in a case where the management server 300 exists outside the firewall 400 (on the same side as the processing execution server 200), the processing execution server 200 does not need to go through the information processing apparatus 100 in order to send the processing result to the management server 300.

Figure 8:
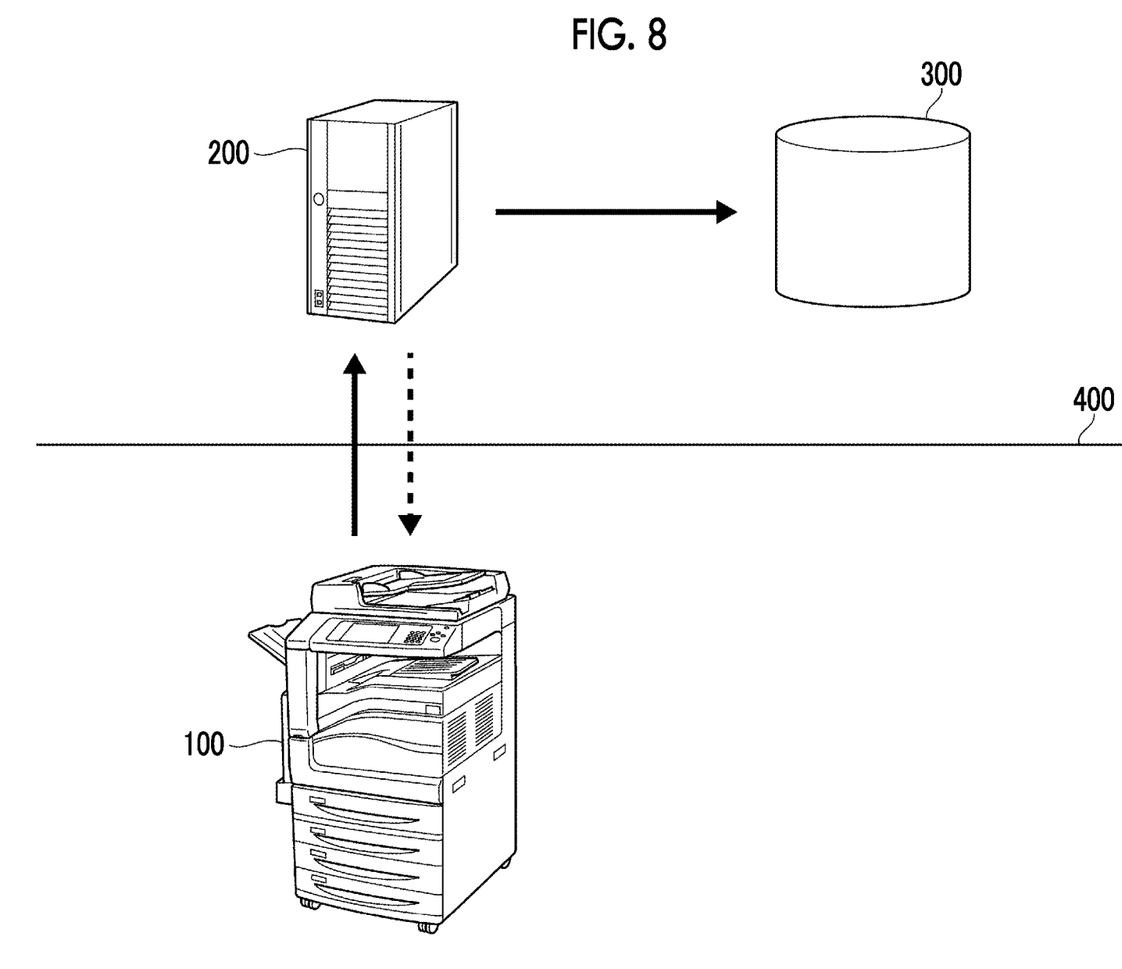
FIG. 8 is a diagram showing a second modification example of the information processing system according to the present exemplary embodiment.

FIG. 8 is a diagram showing a second modification example of the information processing system according to the present exemplary embodiment. In the configuration shown in FIG. 8, the management server 300 is provided outside the firewall 400 (on the same side as the processing execution server 200). Therefore, the processing execution server 200 does not need a transmission request by the information processing apparatus 100, and directly transmits the processing result to the management server 300 after the processing for the data to be processed is completed.

Here, in a case where it is necessary to recognize whether or not the processing of the processing execution server 200 is completed, an inquiry using the long polling or the like may be made in the information processing apparatus 100 as described with reference to the sequence diagram of FIG. 4 and the flowchart of FIG. 5. In this case, the processing execution server 200 does not return the processing result to the information processing apparatus 100 as a response to the inquiry, but returns information indicating that the processing is completed.

Hereinabove, although the exemplary embodiment of the present invention has been described, the technical scope of the exemplary embodiment of the present invention is not limited to the above exemplary embodiment. For example, in the above exemplary embodiment, the processing result of the processing execution server 200, which is acquired by the information processing apparatus 100 in the second job, is transmitted to and stored in the management server 300. In a case where the image processing apparatus is used as the information processing apparatus 100, processing, such as print out of information of the acquired processing result, may be performed. In addition, various changes and substitutions of configurations that do not depart from the scope of the technical idea of the present invention are included in the present invention.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device). In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing system comprising:
an information processing apparatus; and
a server,
wherein the server acquires data to be processed from the information processing apparatus and executes processing on the data, and
the information processing apparatus
acquires identification information from the server;
adds the identification information to the data to be processed and transmits the data to be processed to the server as a first job, wherein the first job is specified based on the identification information,
releases resource of the information processing apparatus used for an execution of the first job after transmitting the first job to the server,
adds the identification information to an acquisition request of a processing result and transmits the acquisition request of the processing result to the server, and
acquires data of the processing result for the data to be processed, which is transmitted to the server in the first job, as a second job different from the first job.

2. The information processing system according to claim 1,
wherein the server gives the identification information to the first job, and transmits the identification information to the information processing apparatus that performs the first job, and
transmits the processing result data for the data, which is acquired by the first job specified based on the identification information, to the information processing apparatus according to the acquisition request of the processing result obtained by adding the identification information in the second job by the information processing apparatus.

3. The information processing system according to claim 2,
wherein the server notifies of completion of the processing after completing the processing of the data, which is acquired by the first job specified based on the identification information, in response to an inquiry of the information processing apparatus, which is performed by adding the identification information.

4. The information processing system according to claim 2,
wherein, in a case where the server accepts an acquisition request for the processing result obtained by adding the identification information by the second job from another information processing apparatus different from the information processing apparatus that performs the first job, the server transmits the processing result data for the data, which is acquired by the first job specified based on the identification information, to the other information processing apparatus.

5. The information processing system according to claim 1,
wherein the information processing apparatus executes processing on the acquired data of the processing result in the second job, and
the server transmits additional information, which is used in processing for the data of the processing result by the information processing apparatus, along with the data of the processing result.

6. The information processing system according to claim 5,
wherein the information processing apparatus executes processing of storing the acquired processing result data in an external apparatus in the second job, and
the additional information, which is used in the processing for the processing result data, is information for specifying a storage destination of the processing result data in the external apparatus.

7. The information processing system according to claim 6, further comprising:
a firewall that is set between the server and a group of the information processing apparatus and the external apparatus.

8. The information processing system according to claim 6,
wherein the storage destination information that specifies the storage destination of the processing result data is changed by the information processing apparatus in a case where the information processing apparatus receives the additional information.

9. An information processing apparatus comprising:
a processor configured to:
perform connection to an external server that can be connected from the information processing apparatus, acquire identification information from the external server, add the identification information to the data to be processed, and transmit data to be processed by the external server as a first job, wherein the first job is specified based on the identification information;
release resource of the information processing apparatus used for an execution of the first job after transmitting the first job to the server;
add the identification information to an acquisition request of a processing result and transmit the acquisition request of the processing result to the external server; and
perform connection to the external server and acquire processing result data for the data transmitted to the external server in the first job, as a second job different from the first job.

10. The information processing apparatus according to claim 9, wherein the processor is configured to:
hold the identification information set for the first job to be shared with the external server; and
make the processing result data acquisition request by adding the identification information in the second job, and acquire the processing result data for data acquired by the first job specified based on the identification information.

11. The information processing apparatus according to claim 10, wherein the processor is configured to:
make an inquiry about processing by the external server by adding the identification information after executing the first job; and
execute the second job in a case where a notification indicating that the processing for the data acquired by the first job specified based on the identification information is completed is received from the external server.

12. The information processing apparatus according to claim 9, wherein the processor is configured to:
acquire additional information used in processing for the processing result data with acquisition of the processing result data in the second job, and execute the processing for the processing result data using the acquired additional information.

13. The information processing apparatus according to claim 12, wherein the processor is configured to:
execute processing of acquiring storage destination information that specifies a storage destination of the processing result data as the additional information used in processing for the processing result data in the second job, and storing the processing result data in the storage destination specified by the storage destination information.

14. The information processing apparatus according to claim 13,
wherein the storage destination information that specifies the storage destination of the processing result data is changed by the information processing apparatus in a case where the information processing apparatus receives the additional information.

15. A non-transitory computer readable medium storing a program causing a computer to execute a process comprising:
performing connection to an external server that can be connected from an information processing apparatus, acquiring identification information from the external server, adding the identification information to the data to be processed, and transmitting data to be processed by the external server as a first job, wherein the first job is specified based on the identification information;
releasing resource of the information processing apparatus used for an execution of the first job after transmitting the first job to the server;
adding the identification information to an acquisition request of a processing result and transmit the acquisition request of the processing result to the external server; and
performing connection to the external server and acquiring processing result data for the data transmitted to the external server in the first job, as a second job different from the first job.

* * * * *